(12) United States Patent
Prystupa et al.

(10) Patent No.: US 11,137,270 B2
(45) Date of Patent: Oct. 5, 2021

(54) SPATIAL MODULATION DEVICE (71) Applicant: 11093606 Canada Ltd., Winnipeg (CA)

(72) Inventors: David Allan Prystupa, Pinawa (CA); John Stephen Pacak, Winnipeg (CA)

(73) Assignee: 11093606 Canado Ltd., Winnipeg (CA)

( * ) Notice: Subject to any disclaimer, the term of this patent is extended or adjusted under 35 U.S.C. 154(b) by 0 days.

(21) Appl. No.: 16/683,376

(22) Filed: Nov. 14, 2019

(65) Prior Publication Data

US 2020/0149931 A1 May 14, 2020

Related U.S. Application Data

(60) Provisional application No. 62/767,193, filed on Nov. 14, 2018.

(51) Int. Cl.
*G01D 5/347* (2006.01)
(52) U.S. Cl.
CPC .................. *G01D 5/34715* (2013.01)
(58) Field of Classification Search
CPC .................................................. G01D 5/34715
See application file for complete search history.

(56) References Cited

U.S. PATENT DOCUMENTS

| 6,317,169 | B1 | 11/2001 | Smith | |
| 10,345,631 | B1* | 7/2019 | Partee | G02F 1/092 |
| 2004/0021078 | A1* | 2/2004 | Hagler | G01J 3/021 |
| | | | | 250/339.13 |
| 2007/0251916 | A1 | 11/2007 | Akahane et al. | |
| 2008/0165401 | A1 | 7/2008 | Kasazumi | |
| 2010/0053729 | A1 | 3/2010 | Tilleman et al. | |
| 2010/0165297 | A1 | 7/2010 | Mizushima | |
| 2011/0013162 | A1* | 1/2011 | Kiuchi | G03F 7/70733 |
| | | | | 355/53 |
| 2016/0033642 | A1* | 2/2016 | Fluckiger | G01S 7/486 |
| | | | | 356/5.01 |
| 2018/0340893 | A1* | 11/2018 | Prystupa | G01J 3/36 |
| 2019/0346736 | A1* | 11/2019 | Partee | G02F 1/292 |

* cited by examiner

*Primary Examiner* — Steven Whitesell Gordon
(74) *Attorney, Agent, or Firm* — Adrian D. Battison; Ryan W. Dupuis; Ade & Company Inc.

(57) ABSTRACT

A method is provided for spatially modulating electromagnetic radiation at high frequency where the modulation is phase, polarization or direction of propagation comprises a substrate carrying an ordered array of optical elements in relative motion with respect to an incident beam of electromagnetic radiation to be modulated and measuring the relative motion. The array contains at least three optical elements and at least two different types of optical elements. At least some of the optical elements are formed from and integral to the substrate material. The optical elements may be fabricated on the substrate material by a subtractive process. The electromagnetic radiation to be modulated is incident on a region of the substrate termed the active region. As the substrate moves relative to the incident electromagnetic radiation, the active region also moves and the designation of individual optical elements changes also.

26 Claims, 7 Drawing Sheets

SPATIAL MODULATION DEVICE

The invention pertains to a method and device for spatially modulating electromagnetic radiation at high frequency. The modulation can be phase, polarization or direction of propagation.

BACKGROUND OF THE INVENTION

Multiplex spectroscopy requires a means to spatially modulate a radiation field. In classical Fourier Transform spectroscopy, phase modulation is performed along the optic axis by optical elements that lie in a plane perpendicular to the optical axis. In classical Hadamard spectroscopy, a code mask is placed in a plane intersecting the optical axis and incident radiation is either transmitted or reflected in the direction of a detector. The modulation in these methods is generally along one path. Preferably but not necessarily the invention is used with high efficiency multiplexing (HEMS) described in U.S. application Ser. No. 15/987,279 filed May 23, 2018 by the present Applicant, which corresponds to PCT Application PCT/CA2018/050599 published on 29 Nov. 2018 as WO 2018/213923 the disclosure of which is incorporated herein by reference. HEMS is a multiplex method that improves the signal to noise ratio (SNR) of particle flux measurements by modulating the particle flux along multiple paths. Hence the HEMS method creates a need for a new class of spatial modulators with multiple output directions that was not required in prior art. The present invention provides a modulation system suitable for use within a HEMS system. The description below includes some references to HEMS and it will be appreciated that these are merely exemplary and the invention herein can be used with other methods.

The number of spectral channels in a multiplex spectrometer is proportional to the number of distinct modulation patterns N applied to input radiation in a measurement series. The number of spectral channels can range from hundreds to thousands, depending on the spectral bandwidth and resolution required by the application. For high throughput industrial inspection applications, hundreds to thousands of objects are inspected per minute requiring data to be collected for each object in milliseconds. Taken in combination these factors lead to a requirement for modulation rates in excess of 100 kHz. Commercially available MEMS devices based on tunable micro mirror arrays are capable of sustained modulation rates of about 5 kHz and burst mode rates of about 50 kHz. The top rate is limited by the inertia of the mirror relative to the (usually electric) force provided to move the mirror. Higher rates are possible by reducing the mirror size, and hence inertia of the mirror. However, when the mirror size approaches the wavelength $\lambda$ of the incident radiation, diffraction effects from the mirror edges become increasingly important. A goal of the present invention is to reduce the edge diffraction effects by allowing larger mirrors to be used. The sustained modulation rate of micro mirror arrays is limited by thermal considerations. MEMS devices, however, have the desirable characteristic of being able to change the set of patterns dynamically in order to change the resolution or to focus on a region of interest. There is hence a requirement for a new class of spatial modulators operable at rates in excess of 100 kHz that are also dynamically adaptable.

The transition between distinct modulation patterns introduces undesirable convolution effects which degrade system performance. Conventionally samples are taken during intervals in which the spatial modulator configuration is near a defined distinct modulation pattern. In systems that require rapid transitions between spatial modulator configurations, a substantial fraction of the duty cycle may be spent in transition rather than collecting data leading to a reduction in the SNR achievable. Hence there is a requirement for methods that increase the duty cycle, the number of photons counted, and the SNR. A further goal of the present invention is to improve the duty cycle by reducing the transition time.

SUMMARY OF THE INVENTION

According to one aspect of the invention there is provided a method for spatially modulating electromagnetic radiation comprising the steps of
collecting the electromagnetic radiation to be spatially modulated;
directing said radiation onto an ordered array of optical elements on a substrate;
translating said substrate to cause at least two different optical elements to engage the incident radiation at two different times;
measuring the substrate position at said two different times;
and transmitting said positions to a user;
wherein the array of optical elements has at least three optical elements and at least two optical elements which modulate said radiation incident thereon differently.

According to one aspect of the invention there is provided a method for measuring the displacement of a substrate comprising the steps of:
directing a light beam onto the substrate with an array of reflective or transmissive position indicators;
causing the substrate to move relative to said light beam so as to transmit or reflect portions of the light beam from at least two different position markers at different times;
measuring the intensity of transmitted or reflected light at time intervals;
and analyzing said measured light intensity at a plurality of times to provide information about the position of the substrate.

According to one aspect of the invention there is provided a method a method for spatially modulating electromagnetic radiation comprising the steps of
collecting the electromagnetic radiation to be spatially modulated;
directing said radiation onto an ordered array of optical elements on a substrate material;
translating said substrate material to cause at least two different optical elements to engage the incident radiation at two different times;
wherein at least some of the optical elements are formed from and integral to the substrate material.

According to one aspect of the invention there is provided a method for spatially modulating electromagnetic radiation comprising the steps of
collecting the electromagnetic radiation to be spatially modulated;
directing said radiation onto an ordered array of optical elements on a substrate;
translating said substrate to cause at least two different optical elements to engage the incident radiation at two different times;
wherein the substrate is a flexible tape forming a closed loop where the tape is translated around the loop and the optical elements are arranged along the direction of translation.

The invention comprises a substrate carrying an ordered array of optical elements in relative motion with respect to an incident beam of electromagnetic radiation to be modulated and a means to measure the relative motion, wherein said array contains at least three optical elements and at least two different types of optical elements.

Preferably at least some of the optical elements are formed from and integral to the substrate material. The optical elements may be fabricated on the substrate material by a subtractive process such as for example etching, machining or laser cutting. The optical elements may be fabricated on the substrate material by an additive process such as, for example deposition of a reflective layer.

The electromagnetic radiation to be modulated is incident on a region of the substrate termed the active region. All of the optical elements with as least some portion of their extent in the active region are termed active. All of the remaining optical elements are termed inactive. As the substrate moves relative to the incident electromagnetic radiation, the active region also moves and the designation of individual optical elements changes also. Preferably the relative motion is periodic causing each optical element to fall inside and outside the active region at regular intervals.

The relative motion may be translational, rotational, or a combination of translation and rotation provided that such motion has the effect of causing the center of the beam of electromagnetic radiation incident on the substrate to impinge on each optical element in a defined sequence. The choice of frame of reference is a matter of convenience. For the present discussion, the frame of reference of the incident electromagnetic radiation is used. In this case the position of the source and direction of propagation of the incident electromagnetic radiation is fixed and the substrate moves. Suppose that the optical elements are a distance $\alpha$ apart. In the case of linear translation the number of optical elements impinged per second herein called line frequency $v_L=v/\alpha$, where v is the linear velocity of the substrate. In this case of rotation, the number of optical elements impinged per second is $v_L=\alpha/r\omega$ where $\omega$ is the angular velocity and r is the radius that optical elements are placed at. The dimension of the optical elements in the direction of translation (or rotation) may be less than a, in which case there is a gap between elements that does not direct incident electromagnetic radiation in the same direction as any optical element. Preferably the gap region, if any, is absorbing.

The arrangement to measure the relative motion may be an optical or magnetic position encoder of conventional design attached to the substrate. Preferably the arrangement to measure the relative motion is intrinsic to the substrate. In a preferred embodiment, the substrate carries an array of reflective or transmissive position indicators placed along the direction of translation or rotation of the substrate. Preferably the array of position indicators has the same periodicity as the array of optical elements. Preferably the array of position markers is parallel to and proximate to the array of optical elements. Preferably the position markers have dimension $\alpha/2$. Preferably the region of substrate between position indicators is coated with an absorbing material. The position markers may reflect or transmit different fractions of the probe beam intensity to convey further information. For example a first type of position marker reflecting or transmitting a first fraction of probe beam intensity signifies the start of a sequence. A second type of position marker reflecting or transmitting a second fraction of probe beam intensity signifies a binary one. A third type of position marker reflecting or transmitting a third fraction of probe beam intensity signifies a binary zero.

These three types of position markers are sufficient to uniquely label every position of an array. A beam of probe radiation is linearly displaced from the incident radiation to be modulated and focused to a region less than or equal to the region occupied by one position indicator. Probe radiation transmitted or reflected from each position indicator is directed to a detector which can be, for example a photodiode. When the probe beam and a first position indicator align, a fraction of probe beam intensity characteristic of said first position marker type is incident on the detector. As the substrate is displaced relative to said first position indicator, the fraction of the probe beam returned to the detector decreases to zero and then rises to a fraction characteristic of a second position marker type as alignment with second position marker is approached. Hence the intensity received at the detector is periodic rising to a characteristic value on alignment with each position marker and falling to zero at the midpoint between position markers. The intensity of the probe beam returned to the detector is sampled temporally at a sampling frequency $v_s$ at least four times higher than the line frequency $v_L$. Preferably, $v_s/v_L>20$. The intensity measured by the detector is transmitted to a digital processor and the digital processor calculates the position of the substrate relative to the center of the incident electromagnetic radiation to be modulated.

Each different type of optical element causes electromagnetic radiation incident on that element to leave that element in a different state than electromagnetic radiation incident on an optical element of a different type. The different state can pertain to direction of propagation, phase, or polarization. At any instant in time, that ordered array is divided into an active region comprising the set of optical elements that have at least some of the incident electromagnetic radiation to be modulated impinging on them and an inactive region comprising the set of optical elements that have none of the electromagnetic radiation to be measured impinging.

One type of optical element is an aperture. In this case, incident electromagnetic radiation exits optical elements of this type unchanged, except for diffraction effects from the aperture edges.

A second type of optical element is transmissive. In this case, incident electromagnetic radiation passes through a transparent medium with a change in phase proportional to the optical thickness of the transparent medium. Each different optical thickness causes a different phase change and hence corresponds to a different type of optical element.

A third type of optical element is reflective. In this case, incident electromagnetic radiation exits the optical element at an angle of reflection equal to the angle of incidence. The orientation of reflective elements can be rotated relative to the direction of incident electromagnetic radiation to give different angles of incidence. Each different angle of incidence causes incident radiation to be reflected in a different direction and hence corresponds to a different type of optical element. Further, reflective optical elements may be in planes perpendicular to the direction of incident electromagnetic radiation and differ only in distance from the mean substrate surface. In this case each distance from the mean substrate surface causes a different phase change and hence constitutes a different type of optical element.

A fourth type of optical element is refractive. In this case, incident electromagnetic radiation impinges upon a material with refractive index different from one and exits the optical element at an angle that depends upon the angle of incidence and said refractive index. As both the angle of incidence and refractive index can be varied to alter the exit direction of electromagnetic radiation, each combination of refractive index and angle of incidence constitutes a different type of optical element.

A fifth type of optical element is diffractive. In this case, incident electromagnetic radiation impinges upon a set of diffraction grating lines that may vary in pitch and orientation. Each variation of pitch and orientation causes incident electromagnetic radiation to be diffracted and interfere constructively in different directions and hence each combination thereof constitutes a different type of optical element.

A sixth type of optical element is polarizing. In this case, incident electromagnetic radiation impinges upon polarizing optic that may vary in orientation, each orientation causing incident electromagnetic radiation to exit with a different polarization state. Hence each polarizer orientation constitutes a different type of optical element.

Different types of optical elements enumerated above can be combined to produce further types of optical elements that alter at least one characteristic of the incident radiation.

In some embodiments, the optical elements are planar and in other embodiments the optical elements have curved surfaces. Specifically, optical elements with curved surfaces may be used to focus radiation incident on said surface to a detector location.

In a most preferred embodiment the movable substrate is a flexible tape translating an array of optical elements in a closed loop wherein the tape is substantially flat for at least one region along the closed loop. Preferably the tape loop is held in a rigid shape by two or more sprockets, which engage the tape through drive apertures so as to translate the tape at a controlled rate. The term substantially flat means that the tape surface is parallel to a line between two of the sprockets within a tolerance of 2 degrees. The flat substrate surface so defined may correspond to an active region where incident electromagnetic radiation interacts with the array of optical elements. The optical elements of each type function to direct electromagnetic radiation in a common direction. In a HEMS application, optical elements of each type direct electromagnetic radiation to a detector dedicated to that type. The optical elements typically have features in a direction normal to the flat substrate larger than a standard deviation in the substrate surface.

In some embodiments, the tape contains regions of varying optical thickness and the regions of varying optical thickness are arranged proximate to one another to change the phase of incident radiation flux so as to generate an interference pattern.

In some embodiments, the pitch of diffractive features varies along the length of the tape. This feature can be used to vary the free spectral range of a diffractive system alternating, for example between a broad spectral survey at low spectral resolution and a higher resolution scan of a spectral region of interest.

In a preferred embodiment, the movable substrate is a disk and the array of optical elements is arranged in a track near the periphery of the disk around the center of rotation and a second concentric track proximate to the array of optical elements contains an array of position markers with the same angular spacing as the optical elements.

In some embodiments the movable substrate is an arc undergoing harmonic motion relative to the incident radiation and the array of optical elements is arranged along the outer edge of the arc.

In some embodiments, the optical elements can transition between at least two different types and said transition occurs during the period when the optical element is in the inactive region. This feature allows the spatial modulator of the invention to change its modulation scheme dynamically without loss of duty cycle due to the transition time. For example, a micro mirror changes from a first fixed angle to a second fixed angle in the inactive zone.

In some embodiments, optical elements such as a micro mirror on the spatial modulator can change orientation. The change in orientation occurs when the element is in an inactive region. For example, on a rotating disk spatial modulator with active region between 0 and 10 degrees, the orientation of optical elements is fixed while in the 0-10 degree range. Transitions occur in the 10-360 degree range. In this example, the required modulation rate is reduced by a factor of 36. This arrangement combines the high line frequency of a translating modulator with the adaptability of a dynamically adjustable micro mirror array.

In some embodiments, at least some of the optical elements are comprised of a material that responds the electro-optic effect and a change in type is effected by applying a voltage across said optical elements.

DETAILED DESCRIPTION

Figure 1:
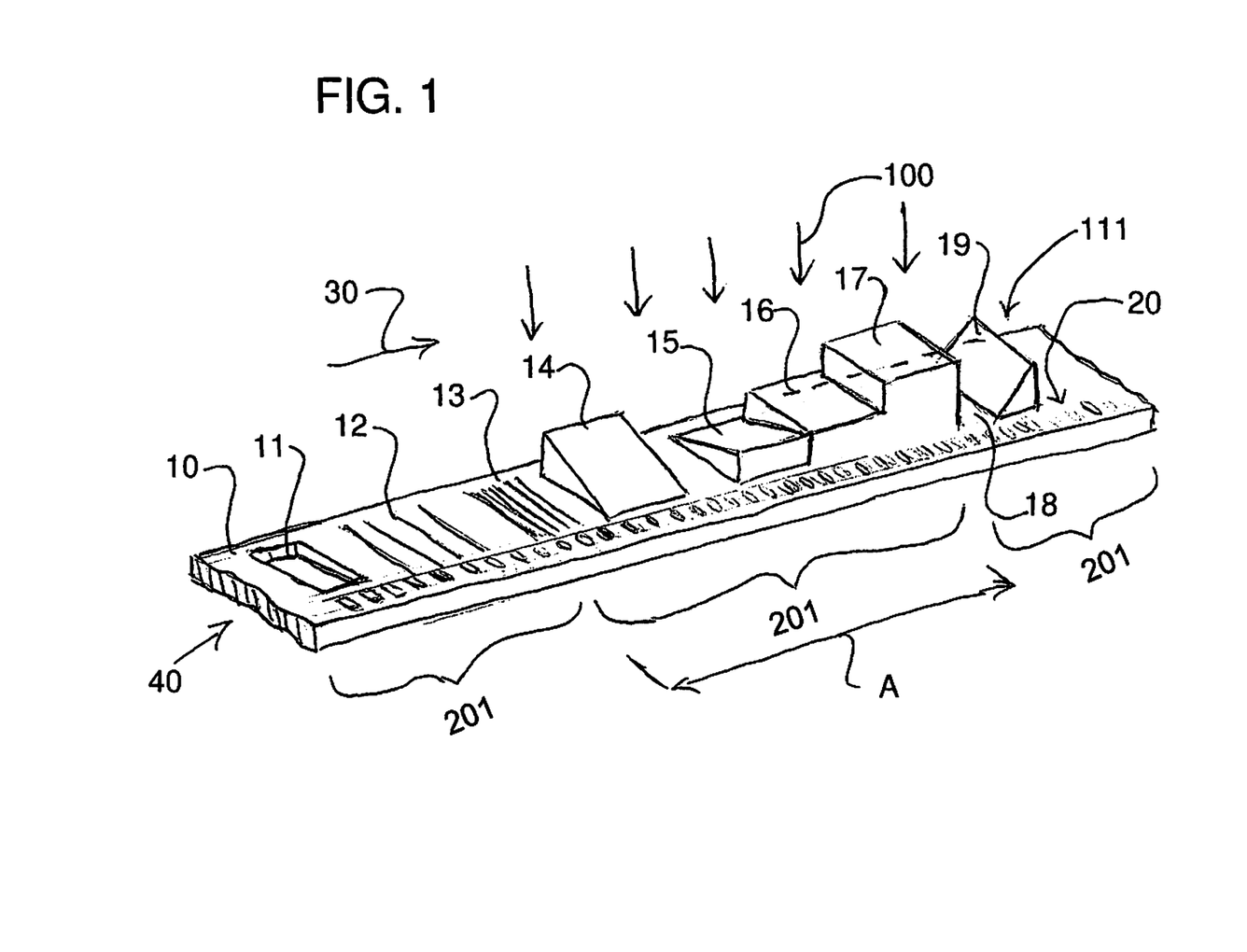
FIG. 1 is a profile view of an enlarged segment of a preferred embodiment of the invention.

FIG. 1 shows a perspective view of a preferred embodiment of the invention. A movable substrate in the form of a tape 10 translates from left to right in the direction indicated at 30 at velocity v carrying array 40 of optical elements 111 including components 11, 12, 13, 14, 15, 16, 17, 19 through region 200 where incident electromagnetic radiation is incident on substrate 10. The region 200 is designated the active region and adjacent regions 201 are designated inactive regions. Optical elements within the active region 200 modulate incident electromagnetic radiation to an 'on' state. Optical elements within the inactive region 201 modulate incident electromagnetic radiation to an 'off' state. The segment shown is preferably part of a closed loop of overall length L. The active region 200 is of length A. Optical elements in the active region will direct incident EM radiation in a distinct direction specified by optical element type for a time A/v with a repeat period L/v.

Optical element 11 is an aperture that allows incident EM radiation to pass through substantially unchanged except for diffraction effects due to the edges of the aperture. The diffraction effects are minimal if the sides of the aperture are much larger than the wavelengths of incident EM radiation. Aperture 11 is within inactive region 201 and hence no EM radiation passes through at the instant in time illustrated. However aperture 11 will enter active region 200 at a later time as the substrate 10 translates in the direction 30.

Modulation is achieved because transmission through aperture 11 occurs only when aperture 11 is in the active region 200.

Optical elements 12 and 13 are diffraction gratings with different pitch. Incident EM radiation at each wavelength is diffracted into multiple orders. For order 0, EM radiation is reflected into the same direction by diffraction gratings 12 and 13. For orders other than 0, (ie +/−1) diffraction gratings 12 and 13 diffract incident EM radiation into different angles. Diffraction grating 12 is wholly in inactive region 201 and hence no EM radiation is observed at angles determined by the pitch of diffraction grating 12. Diffraction grating 13 is partly in active region 200 and hence directs incident EM into angles determined by the grating pitch for as long as diffraction grating 13 remains within the active region 200. Optical elements 12 and 13 may be diffraction gratings comprised of dynamically adjustable micro mirror arrays that can change pitch while in the inactive region 201 by changing the orientation of rows of micro mirrors.

Optical elements 14 and 15 are mirrors inclined at different angles with respect to the incident EM radiation 100 and consequently said EM radiation is reflected into different angles while mirrors 14 and 15 are within active region 200. A detector placed at the appropriate angle of reflection for each will observe reflected EM radiation, the mere presence could, for example denote a binary '1'. As the substrate tape 10 translates in direction 30, optical element 15 will enter the inactive region 201 and a short time later optical element 15 will enter the inactive region 201. The absence of reflected EM radiation could, for example represent a binary '0'. In some embodiments the angle of inclination of the mirror elements 14 and 15 can change while said elements are in the inactive region 201.

Optical elements 16 and 17 are reflective mirrors parallel to the substrate surface. Incident EM radiation is reflected at the same angle by each, but with different phase due to the difference in elevation above the mean substrate plane. Optical elements 16 and 17 could, for example be part of a Fabry Perot filter or interferometer. Optical elements 16 and 17 could, for example be part of a step scan Michelson interferometer. As shown, optical elements 16 and 17 are in the active region 200. With translation in direction 30, optical elements 16 and 17 enter the inactive region 201 where, in some embodiments the elevation of the mirror surface may be changed to produce a different phase shift in the next repeat period for the element L/v.

Optical element 19 is a dispersive prism with an adjacent buffer region 18, both lying within inactive region 201. When prism is in the active region 200, incident EM radiation is refracted into an angle determined by the prism geometry and the refractive index of the prism. In some embodiments buffer regions 18 are used to provide an unobstructed optical path for adjacent optical elements. In some embodiments, optical elements abut with no buffer regions.

An array of position indicators is shown at 20 proximate and parallel to array of optical elements 40. As shown the position indicators are apertures that transmit a probe beam (not shown) when part of said aperture intersects the probe beam. A detector (not shown) measures the intensity of transmitted probe beam and a computation device calculates the position of the substrate relative to the probe beam.

The example shown in FIG. 1 may be used, for example in a multiplex spectrometer as described in the HEMS application cited above.

Figure 2:
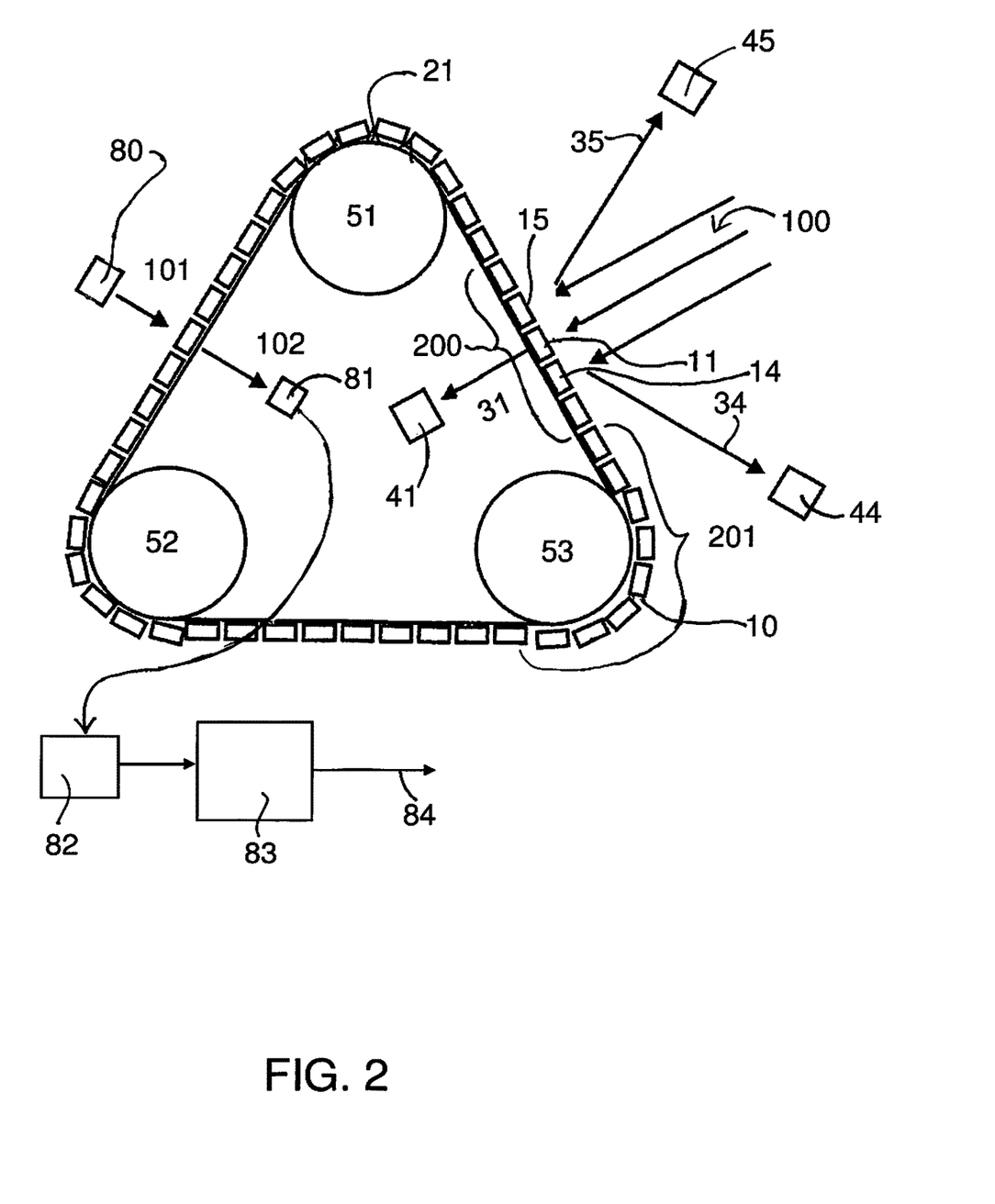
FIG. 2 is a schematic view of the embodiment of FIG. 1 showing a closed loop.

FIG. 2 gives a schematic top view of the arrangement shown in FIG. 1. Tape substrate 10 forms a closed loop around sprockets 51, 52 and 53. The tape carries optical elements comprising mirrors with different angles of inclination shown at 14 and 15 and apertures 11. The incident EM radiation 100 to be modulated is incident on active region 200, which is substantially flat between sprockets 51 and 53. The incident EM radiation may for example be dispersed by wavelength over the active region 200 in a HEMS application. Modulated EM radiation from aperture elements 11 travels in the direction 31 and is observed at detector 41. Modulated EM radiation from mirror elements 14 travels in the direction 34 and is observed at detector 44. Modulated EM radiation from mirror elements 15 travels in the direction 35 and is observed at detector 45. For illustrative purposes detectors 44 and 45 are drawn in the plane of the tape substrate 10. In a preferred embodiment mirrors 14 and 15 are tilted in directions perpendicular to the direction of belt motion and the detectors 44 and 45 are above and below the plane of the drawing. Probe beam 101 is generated by light source 80 and the portion transmitted through a position indicator aperture (not shown) generates a beam 102 which is received by photodiode 81 and converted to digital amplitude by analog to digital converter 82. The sequence of digital amplitudes is analyzed by computing device 83, which outputs a digital representation of the substrate tape position 84 transmitted to a user. The position information is crucial to the operation of an optical instrument based on the spatial modulator of the arrangement herein because the exact modulation configuration operable can be calculated from the position information and knowledge of the spatial modulator geometry. In a HEMS application, the aperture 11 and mirrors 14 and 15 may for example have width along the direction of tape travel of 50 microns and a tape substrate speed of 50 m/s to give a modulation rate of 1 MHz. With the arrangement of this example, spectra with 1000 wavelength channels can be measures in 1 ms. Higher and lower modulation rates may be produced by the arrangement of FIG. 2.

Figure 3:
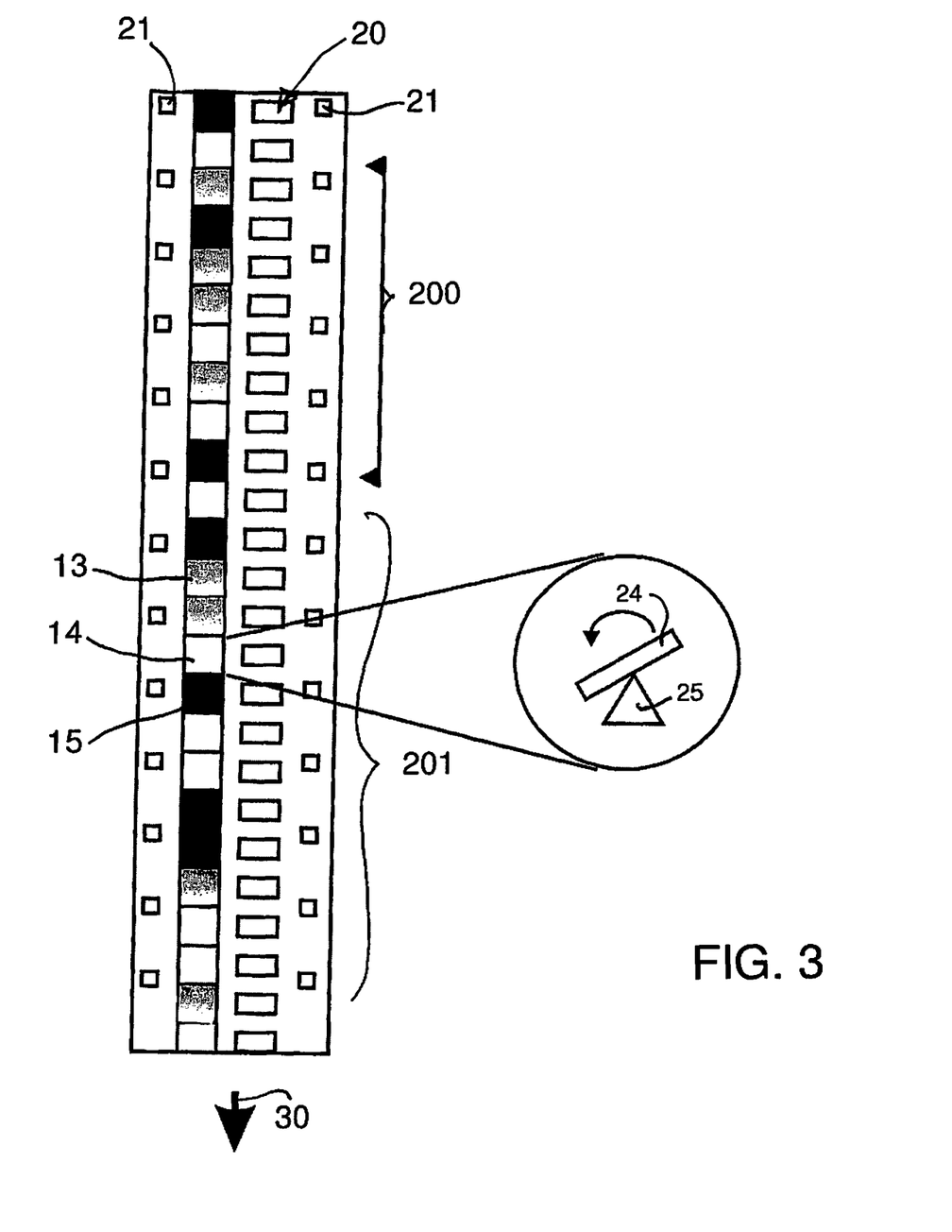
FIG. 3 is another schematic view of the preferred embodiment showing a dynamically changing optical element.

FIG. 3 gives a schematic view of the tape substrate shown in FIG. 1. Three types of optical elements 13, 14 and 15 (shaded differently) are arrayed in a line along the tape axis moving in direction 30. The active region is denoted 200. Optical element 14 is a movable mirror in the inactive region 201 shown enlarged 24 rotating about a pivot 25 to a new position. Position indicators 20 lie in a row parallel to the array of optical elements 40. Two rows of apertures 21 shown in FIG. 3 engage with sprockets 51, 52 and 53 shown on FIG. 2 to translate the tape substrate 10.

Figure 4A:
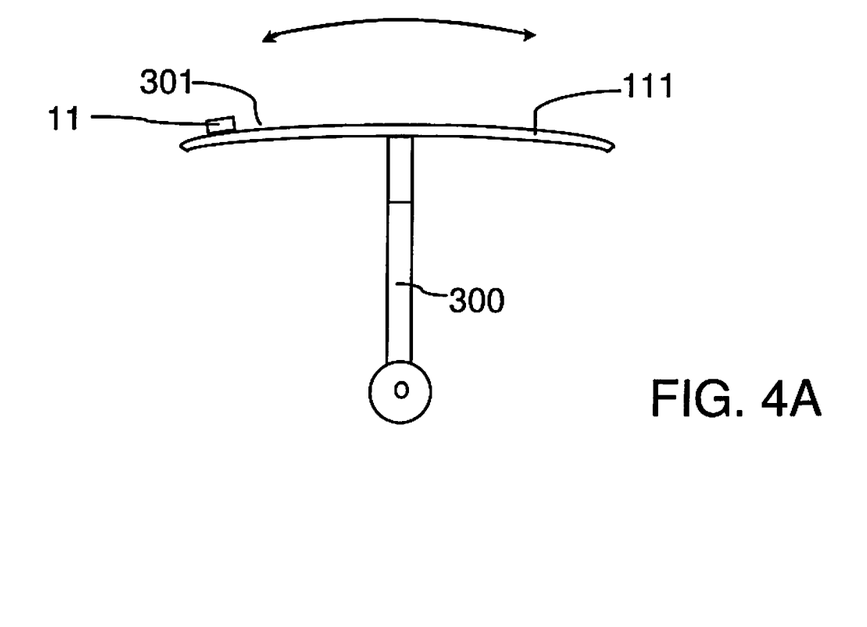
FIG. 4a is a schematic view of a pendulum embodiment of the invention.

FIG. 4a shows an alternate arrangement wherein the array of optical elements 111 best shown in FIG. 1 is mounted on a substrate 301 carried on a pendulum or a rod 300 undergoing harmonic motion. The rod may for example be excited to oscillate at a resonant frequency on a MEMS device. For sub millimeter scale MEMS devices, oscillation is technically easier to achieve than linear translation. The optical elements can be mounted either along an arc in the plane swept out by the pendulum arm or in an arc in a plane perpendicular to the pendulum axis. The example shown in FIG. 4a may be used, for example in a multiplex spectrometer as described in the HEMS application.

Figure 4B:
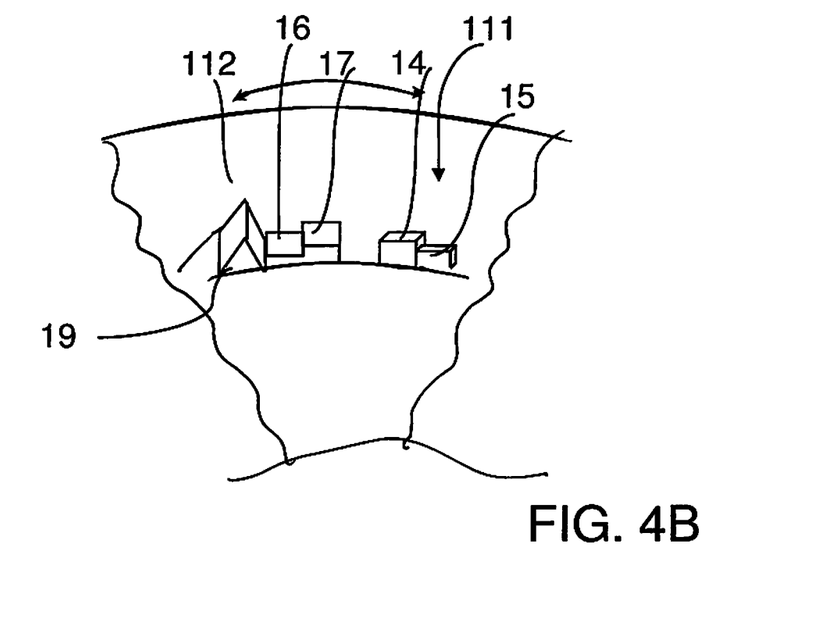
FIG. 4b is a profile view of a disk embodiment of the invention.

FIG. 4b shows a perspective view of an embodiment wherein an array of optical elements 111 is mounted around the circumference of a disk 112 perpendicular to the plane of the disk. In this arrangement the optical elements are at a constant radius and preset constant width to incident radiation. Optical elements arranged to fill space in the plane of a disk are generally wedge shaped, which distorts resolution for a HEMS spectrometer. The distortion may be reduced below a threshold by increasing the radius at which optical elements are located.

Figure 5:
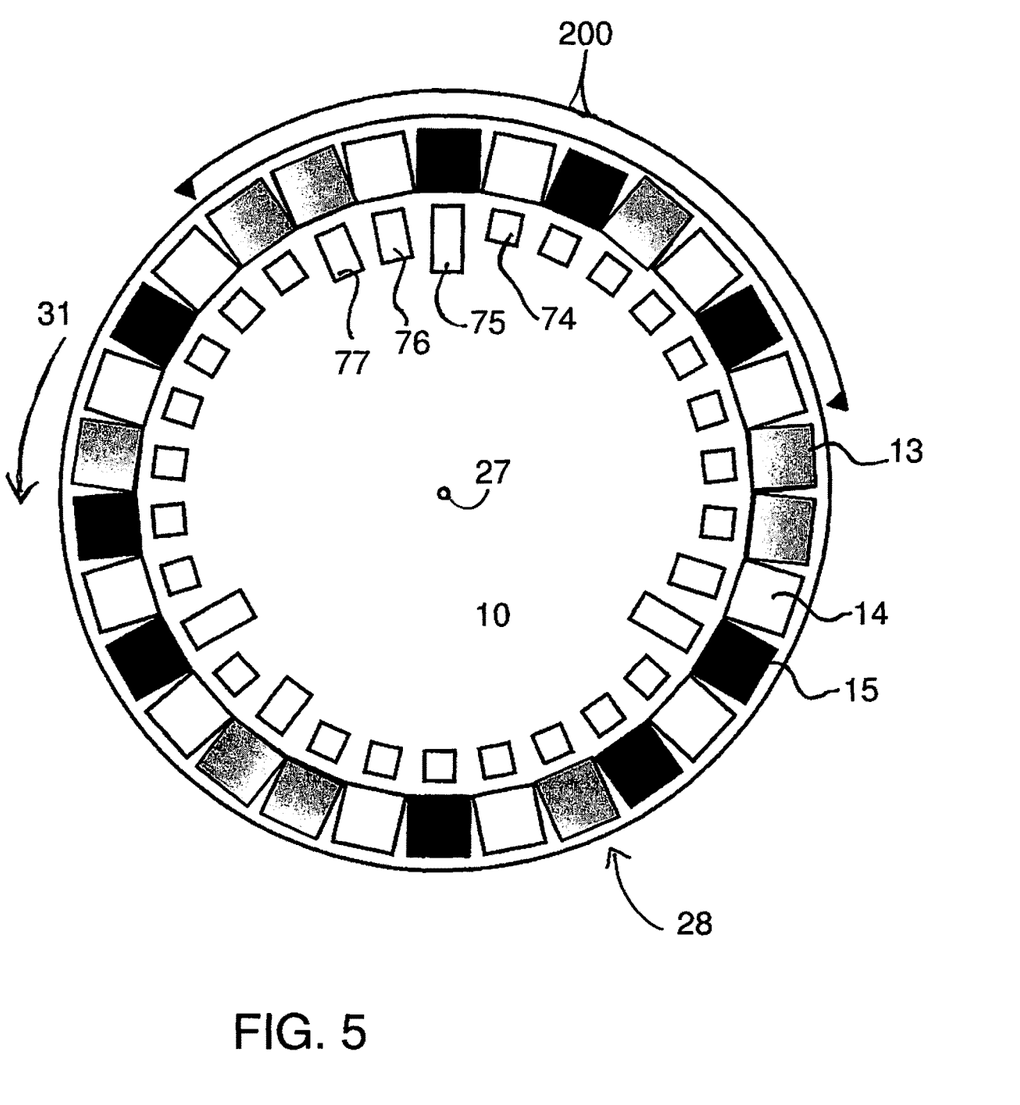
FIG. 5 is a schematic view of a disk embodiment of the invention showing different types of position markers.

FIG. 5 shows a top view of a substrate 10 in the form of a disk 28 with axis of rotation 27 with direction of rotation 31. The active region is denoted 200. The disk substrate 10 carries three types of optical elements 13, 14 and 15 shaded differently arranged to form a code sequence of length ten in the active region 200. Three different types of position indicators are shown at 74, 75 and 76 with different radial dimensions. Position markers 74, 75, and 76 transmit different amplitudes of probe beam best shown in FIG. 2. In the example shown, position marker 75 with the largest radial length denotes the start of a code sequence, and position markers 74 and 76 denote binary '0' and '1', respectively which are used to label each sector of code sequence. Position marker 76 is distinguished from position marker 74 by greater radial length. The values assigned to position markers of different length may be interchanged and there may be a plurality of lengths denoting a plurality of values. In a noisy environment, the binary levels as illustrated are the most robust. In the example shown, the sector label in the active region is denoted by position indicators 76 and 77 as binary '11'. In the example shown, two binary digits are sufficient to uniquely label all of the sectors. More binary digits may be used. The start and end of a sector label are referenced by displacements relative to the index peak 75. The sector label as shown is adjacent to index peak 75, but may occur anywhere between index peaks. The sector label region between a first index peak and a second index peak is preferably closer to the first index peak, in which case the direction of translation or rotation may be inferred. The example shown in FIG. 5 may be used, for example in a multiplex spectrometer as described in the HEMS application.

Figure 6:
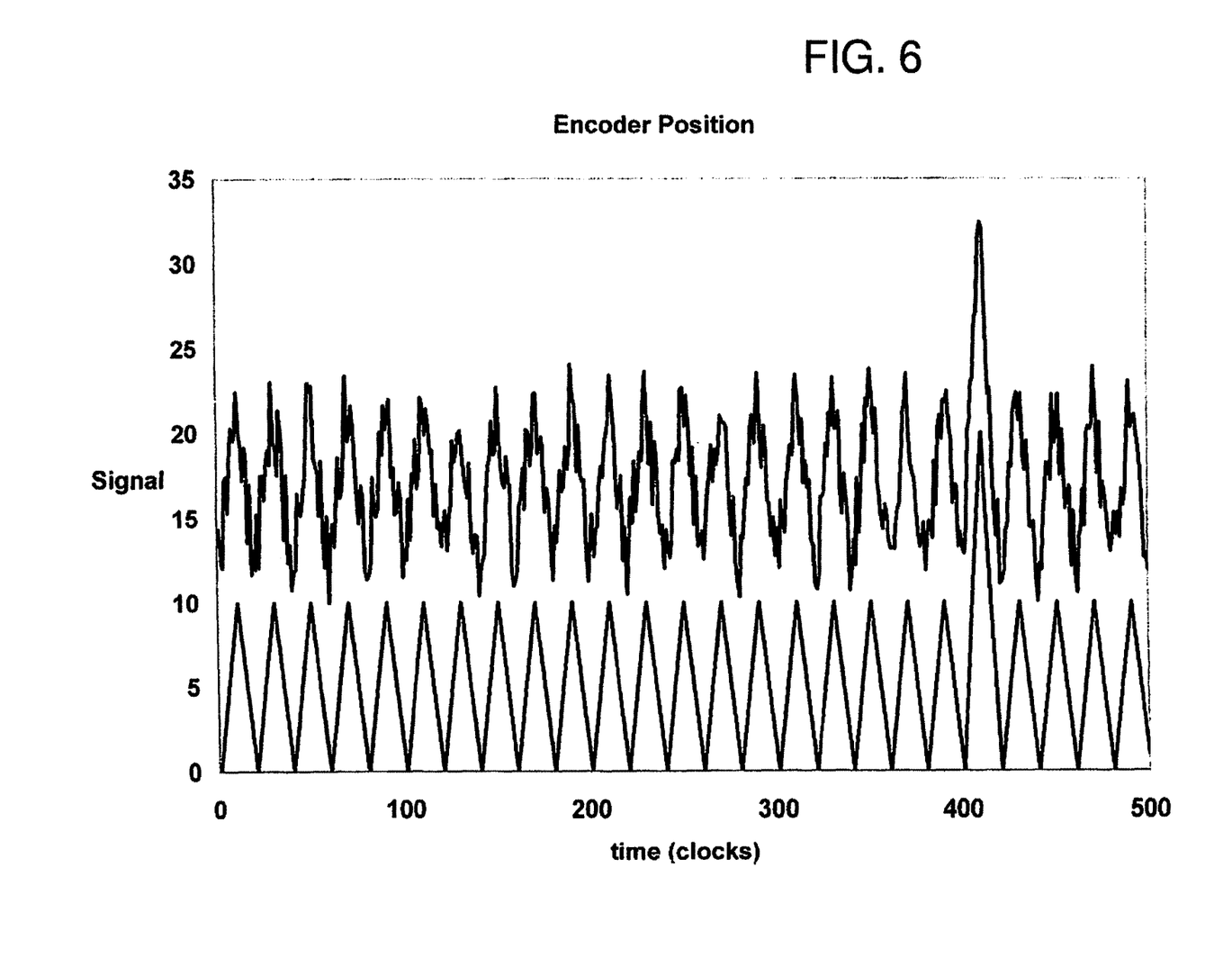
FIG. 6 is a plot of the theoretical and noisy waveforms from a sequence of position markers.

FIG. 6 shows the theoretical waveform received by a detector 81 on FIG. 2 (bottom curve) and a corresponding waveform with noise added (top curve). The main peak corresponds to a position indicator marking the start of a code sequence best shown as 75 on FIG. 5 and is designated the index peak. The remaining peaks correspond with position indicators 74 in FIG. 5. Some of the position markers 74 may be used as sector identifiers, in which case they all have the same value. The periodicity of the peak positions varies due to noise when analyzed with a prior art comparator. A comparator triggers when a threshold is reached. Noise in the signal shifts the position of the threshold and noise in the comparator may shift the threshold value itself. In the present invention position jitter caused by noise is greatly reduced by sampling the waveform from the position indicators at a frequency much higher than the waveform frequency to obtain at least 4 and preferably more than 20 points per peak. In simulation, higher sampling rates reduce the difference between measured and actual position and provides improved resistance to the effects of noise. Peaks are numbered consecutively starting with the index peak.

Figure 7:
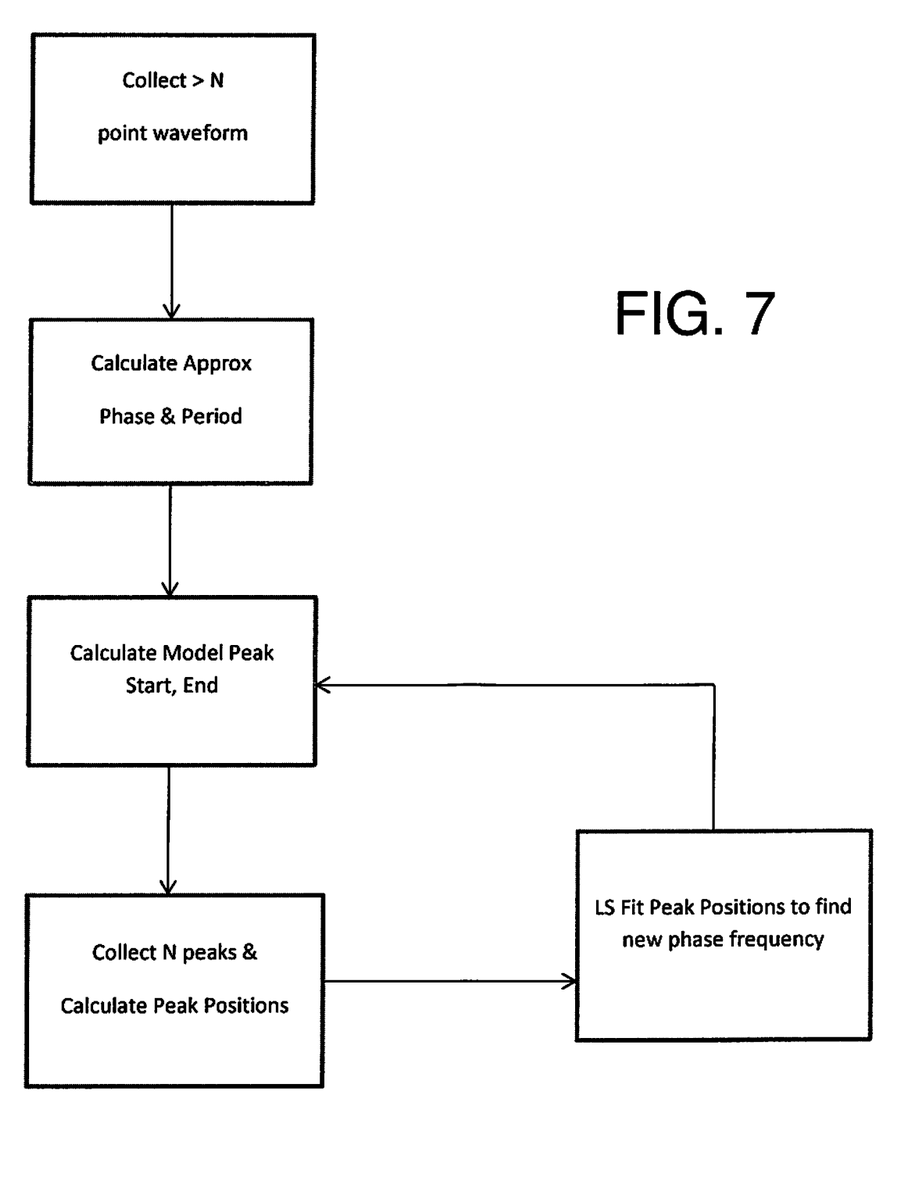
FIG. 7 is a flow diagram illustrating a method to measure position.

As shown in FIG. 7, once the approximate frequency and phase of the waveform are known, approximate positions of the minima in the waveform relative to the index peak can be calculated and used as integration limits to calculate the peak area and moment. The peak moment is the calculated as the sum of displacements from the index peak (in fractional peak width units) multiplied by the measured peak amplitude at each displacement between the approximate minima displacements. The peak area is the sum of peak amplitudes between the approximate minima displacements. The peak center is calculated as the peak moment divided by the peak area. The locations of N peak centers obtained and then a least squares regression is done to correlate peak numbers with peak centers. The slope and intercept of the regression give the frequency and phase, respectively. These improved approximations to frequency and phase are used to calculate the next set of minima. That is with each iteration of the algorithm, the measured peak positions in the presence of noise converge to actual peak positions. The position of the substrate can be calculated from the frequency, phase and number of clock ticks (measurements at the ADC) since the last index peak. The accuracy achieved is approximately 20% of the translation between ADC measurements, which translates to about 1% of the size of an optical element at 20 measurements per line period.

The invention claimed is:

1. A method for spatially modulating electromagnetic radiation comprising the steps of collecting the electromagnetic radiation to be spatially modulated;
   directing said radiation onto an ordered array of optical elements carried on a substrate;
   translating said substrate to cause the incident radiation to engage at least a portion of each of two different optical elements of said optical elements such that each of said two optical elements engages the incident radiation at two different times;
   generating a position measurement of a position of the substrate at a plurality of times between said two different times;
   and transmitting said generated position measurements to a user;
   wherein the array of optical elements has at least three optical elements and at least two optical elements which modulate said radiation incident thereon differently.

2. The method according to claim 1 wherein the optical elements of the spatial modulator direct electromagnetic radiation to be modulated into at least two different directions.

3. The method according to claim 1 wherein the optical elements of the spatial modulator direct electromagnetic radiation to be modulated into at least three different directions.

4. The method according to claim 1 wherein the optical elements of the spatial modulator produce at least two different phase changes in the electromagnetic radiation to be modulated.

5. The method according to claim 1 wherein the optical elements of the spatial modulator produce at least three different phase changes in the electromagnetic radiation to be modulated.

6. The method according to claim 1 wherein the optical elements of the spatial modulator alter the polarization of incident radiation to be modulated in at least two different ways.

7. The method according to claim 1 wherein the optical elements of the spatial modulator alter the polarization of incident radiation to be modulated in at least three different ways.

8. The method according to claim 1 wherein the optical elements of the spatial modulator are integral to the substrate material.

9. The method according to claim 8 wherein the optical elements are fabricated on the substrate material by a subtractive process such as for example etching, machining or laser cutting.

10. The method according to claim 8 wherein the optical elements are fabricated on the substrate material by an additive process such as, for example deposition of a reflective layer.

11. The method according to claim 1 wherein the optical elements are chosen from the set of aperture, mirror, diffraction grating, phase plate, refracting wedge, refracting prism, and polarizer.

12. The method according to claim 1 wherein the optical elements comprise mirrors that can take at least two different configurations.

13. The method according to claim 1 wherein at least one optical element changes configuration at least once and said configuration change occurs when said optical element is not exposed to electromagnetic radiation to be modulated.

14. The method according to claim 1 wherein the position measurement uses a component integral to the substrate and proximate to the optical elements.

15. The method according to claim 1 wherein the substrate is a flexible tape forming a closed loop where the tape is translated around the loop and the optical elements are arranged along the direction of translation.

16. The method according to claim 1 wherein the substrate is a rotating disk and the optical elements are arranged at a common radial distance from a rotation axis.

17. The method according to claim 1 wherein the substrate is an arc undergoing periodic and/or reciprocating rotational motion about an axis of the arc and the optical elements are arranged along the arc at a common radial distance from the axis of rotation.

18. The method according to claim 1 wherein the position measurement is generated by the steps of:
   directing a light beam onto the substrate with an array of reflective or transmissive position indicators;
   causing the substrate to move relative to said light beam so as to transmit or reflect portions of the light beam from at least two different position markers at different times;
   measuring the intensity of transmitted or reflected light at time intervals;
   and analyzing said measured light intensity at a plurality of times to provide said position measurement.

19. The method according to claim 18 wherein the light beam intersects with zero or one position markers at any instant in time and the light beam intersects at least two different position markers at different instants in time.

20. The method according to claim 19 wherein the intensity of the light beam transmitted or reflected from each position marker is measured at least four times at four different substrate positions; and wherein at least some light transmitted or reflected from said position marker is included in each measurement.

21. The method according to claim 19 wherein the intensity of the light beam transmitted or reflected from each position marker is measured at least twenty times for at least twenty different substrate positions; and wherein at least some light transmitted or reflected from said position marker is included in each measurement.

22. The method according to claim 19 wherein the position measurement of the substrate is calculated by performing a least squares fit to the locations of at least three position markers.

23. The method according to claim 19 wherein there are at least two types of position markers that transmit or reflect different fractions of a probe light beam and the difference in intensity is analyzed to provide said position measurement.

24. A method for spatially modulating electromagnetic radiation for measuring one or more dependent variables of an incident radiation comprising the steps of collecting the electromagnetic radiation to be spatially modulated;
   directing said radiation onto an ordered array of optical elements carried on a substrate;
   translating said substrate to cause the incident radiation to engage at least a portion of each of two different optical elements of said optical elements such that each of said two optical elements engages the incident radiation;
   said optical elements being arranged to direct the incident radiation into at least two different paths;
   generating a position measurement of a position of the substrate at least at said two different times;
   calculating the modulation configuration from said position measurement;
   measuring the total intensity of radiation in each path with a detector for each modulator configuration to provide a plurality of detector outputs;
   analyzing the detector outputs in relation to modulation configuration to obtain information relating to the dependent variables of the radiation to be measured;
   wherein the array of optical elements has at least three optical elements and at least two optical elements which modulate said radiation incident thereon differently.

25. A method for spatially modulating electromagnetic radiation comprising the steps of collecting the electromagnetic radiation to be spatially modulated;
   directing said radiation onto a portion of an ordered array of optical elements carried on a substrate;
   translating said substrate to cause the portion of the ordered array exposed to radiation to change such that incident radiation engages at least a portion of each of two different optical elements at two different times;
   generating a position measurement of a position of the substrate at least at said two different times;
   and transmitting said generated position measurements to a user;
   wherein the array of optical elements has at least three optical elements and at least two optical elements which modulate said radiation incident thereon differently;
   wherein the optical elements can take at least two different configurations;
   wherein at least one optical element changes configuration at least once and said configuration change occurs when said optical element is not exposed to electromagnetic radiation to be modulated.

26. A method for spatially modulating electromagnetic radiation comprising the steps of collecting the electromagnetic radiation to be spatially modulated;
   directing said radiation onto an ordered array of optical elements carried on a substrate;
   translating said substrate to cause the incident radiation to engage at least a portion of each of two different optical elements of said optical elements such that each of said two optical elements engages the incident radiation;
   generating a position measurement of a position of the substrate at least at said two different times;
   and transmitting said generated position measurements to a user;
   wherein the array of optical elements has at least three optical elements and at least two optical elements which modulate said radiation incident thereon differently;

wherein the position measurements are made by measuring the intensity of a beam of probe radiation reflected or transmitted from an array of position indicators having the same periodicity T as the array of optical elements;
wherein the position indicators have dimension T/2;
wherein a beam of probe radiation is focused to a region less than or equal to the area of one position indicator;
wherein at least four radiation intensity measurements are made during the translation of the substrate through one period T over one position indicator;
and wherein the substrate position is determined by least squares analysis of radiation intensity measurements for a plurality of periods.

* * * * *